June 11, 1940.  J. H. BLANKENBUEHLER  2,203,717

POWER SYSTEM

Filed Sept. 20, 1939

WITNESSES:
Edward Michaels
F. V. Giolma

INVENTOR
John H. Blankenbuehler.
BY
G. M. Crawford
ATTORNEY

Patented June 11, 1940

2,203,717

UNITED STATES PATENT OFFICE 2,203,717

POWER SYSTEM

John H. Blankenbuehler, Edgewood, Pa., assignor to Westinghouse Electric & Manufacturing Company, East Pittsburgh, Pa., a corporation of Pennsylvania Application September 20, 1939, Serial No. 295,738

12 Claims. (Cl. 290—40)

My invention relates generally to power systems, and it has reference, in particular, to the control of an internal combustion engine used for driving a plurality of generators in a power supply system.

Generally stated, it is an object of my invention to provide a simple and effective manner for controlling the speed of an internal combustion engine driving a plurality of generators connected to independent load circuits.

More specifically, it is an object of my invention to provide for controlling the operation of an internal combustion engine driving a plurality of generators so as to operate the engine within a predetermined range of speed so long as any one of the generators is loaded, and effect a reduction from operating speed to idling speed within a predetermined interval of time after the removal of the load from all of the generators.

Another object of my invention is to provide a compact and efficient control device for controlling the operation of an internal combustion engine driving a plurality of generators which are disposed to be independently loaded at different intervals.

A further object of my invention is to render ineffective the speed-responsive governor of a prime mover which is connected to drive a plurality of generators and cause the prime mover to operate at idling speed after a predetermined interval of time following the removal of the load from all the generators.

Other objects will, in part, be obvious and will, in part, appear hereinafter.

In practicing my invention, the governor of an internal combustion engine, which is connected to drive a plurality of generators that may be independently loaded at different intervals, is controlled by an idling device which normally functions to render the governor ineffective to open the throttle of the engine any more than is necessary to produce an idling speed. The idling device is provided with a plurality of control windings, each individual to a generator load circuit, for causing the idling device to render the governor effective to control the engine speed on application of load to any one of the generators and for causing the idling device to effect a reduction in the speed of the engine from operating speed to idling speed in response to the removal of the load from all of the generators, the idling device being operable to produce such speed reduction only after a predetermined time interval.

For a more complete understanding of the nature and scope of my invention, reference may be had to the following detailed description, taken in connection with the accompanying drawing, in which.

Figure 1:
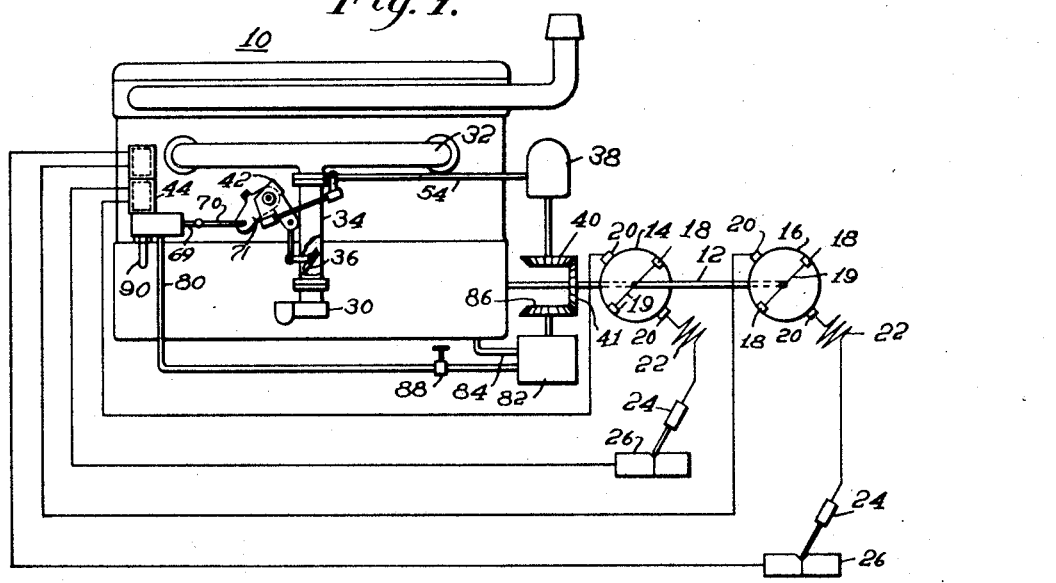
Figure 1 is a diagrammatic view of a power system embodying the principal features of the invention.

Referring particularly to Fig. 1, the reference numeral 10 may denote generally a prime mover of any suitable type such, for example, as an internal combustion engine, which is connected by means of the shaft 12 for driving the generators 14 and 16.

The generators 14 and 16 may be of any type well-known in the art, such, for example, as generators of the cross-field type, having auxiliary brushes 18 which are connected in closed-circuit relation by the conductor 19 so as to provide an armature excitation circuit, and main brushes 20 positioned with their axes at right angles to the axis of the auxiliary brushes 18. The generators 16 and 18 may be provided with suitable field windings such as the series field windings 22, which may be connected in series circuit relation with the main brushes 20, the welding electrode 24, and work 26 upon which a welding operation is to be performed.

The internal combustion engine 10 may be provided with a carburetor 30, which is connected to the engine by an intake manifold 32 for supplying fuel thereto by means of the intake riser 34. In order to control the speed of the engine 10, suitable means, such, for example, as the throttle valve 36, may be positioned in the intake riser 34 for controlling the flow of fuel to the engine.

In order to maintain the operating speed of the engine 10 within a predetermined range under varying load conditions, suitable means such as the governor 38, operatively connected to the shaft 12 by means of the bevel gears 40 and 41, may be provided, and connected to the throttle valve 36 by means of the lever system including a bell-crank lever 42, as shown.

For the purpose of limiting the fuel consumption of the internal combustion engine 10, an idling device 44 may be provided for rendering the governer 38 ineffective and actuating the throttle valve 36 to the idling position after the lapse of a predetermined interval of time after the removal of the load from the generators 14 and 16.

Figure 2:
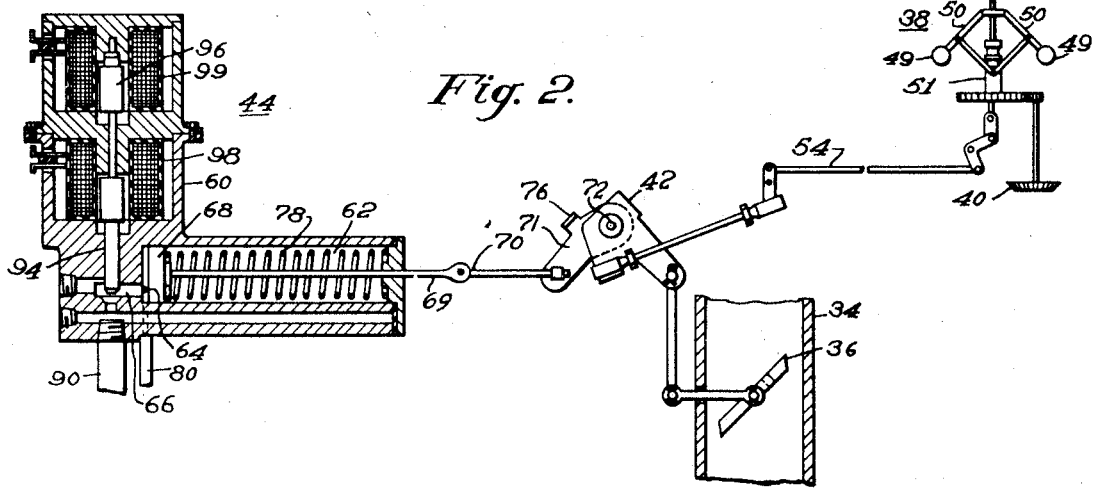
Fig. 2 is a schematic diagram illustrating the details of construction of the speed control devices of the system of Fig. 1.

Referring particularly to Fig. 2, it may be seen that the governor 38, which may be of any suitable type, may, for example, comprise a well-known form of fly-ball mechanism, having a pair of fly-balls 49 mounted on arms 50 that are pivotally connected to a shaft 51, which may be driven by the gear 40, so that the centrifugal force of fly-balls opposes the force of a spring 52, which is connected through a suitable lever mechanism 54 so as to urge the throttle valve 36 to the closed or idling position.

The idling device 44, which is utilized to render the governor 38 ineffective is disposed to actuate the bell-crank lever 42 so as to close the throttle valve 36 to the idling position. The idling device may be of any suitable type, comprising, for example, a casing 60 having a cylinder 62 positioned therein, which is provided with an inlet port 64 of restricted dimension, and an enlarged exhaust port 66. A piston 68 may be slidably positioned in the cylinder 62 and operatively connected to effect the actuation of the governor to the idling position in any suitable manner, such as by means of a piston rod 69, a connecting rod 70, pivotally connected to the piston rod. and a suitable lever 71, which may be pivotally mounted on the shaft 72 of the bell-crank lever 42 and provided with a projecting stop member 76 for engaging the bell-crank lever 42. A spring 78 may be provided for normally urging the piston 68 towards the left-hand end of the cylinder 62 so that the stop member 76 is disengaged from the bell-crank lever 42.

Referring to both Figs. 1 and 2 of the drawing, it may be seen that the inlet port 64 of the cylinder 62 may be connected by means of a suitable pipe or conduit 80 to a source of fluid pressure, such as the oil pump 82 connected to the crankcase of the engine, by means of an intake conduit 84, and operatively connected so as to be driven from the shaft 12 by means of the gear 86. An adjustable valve 88 of any suitable type may be provided in the supply conduit 80 for controlling the rate of flow of the oil from the pump 82 to the cylinder 62 of the idling device. The exhaust port 66 of the idling device may be connected by means of a suitable conduit 90 to return the oil to the crankcase of the engine, or other source.

In order to control the operation of the piston 68 a control valve 94 may be provided for controlling the passage of the oil or other pressure fluid through the exhaust port 66. So that the operation of the control valve 94 may be controlled in accordance with the load conditions of the welding generators 14 and 16, an armature 96 may be provided for actuating the control valve 94 from the normally closed position, and suitable operating winding 98 and 99 provided for connection in the load circuits of the generators 14 and 16, respectively, which are individually adapted to effect operation of the armature 96 for actuating the control valve 94 to the open position upon the application of a load to either of their respective generators.

With the engine 10 running and a load applied to either or both of the generators 14 and 16, either or both of the operating windings 98 and 99 of the idling device 44 will be energized, so that the armature 96 is actuated to maintain the control valve 94 in the open position, as shown in Fig. 2. Pressure fluid or oil from the pump 82 is supplied to the cylinder 62 of the idling device 44 through the conduit 80 and the inlet port 64, but since the valve 94 is open, the oil returns through the conduit 90 to the crankcase. No pressure is, therefore, built up in the cylinder 62, and the piston 68 remains in the position shown, so that the governor 38 may function to control the throttle valve 36, so as to maintain the speed of the engine within a predetermined operating range.

If both of the generators 14 and 15 are loaded, the removal of the load from one or the other of the generators will have not effect on the operation of the idling device 44, since the energization of either of the operating windings 98 and 99 thereof is effective to actuate the armature 96 and maintain the control valve 94 in the open position.

Figure 3:
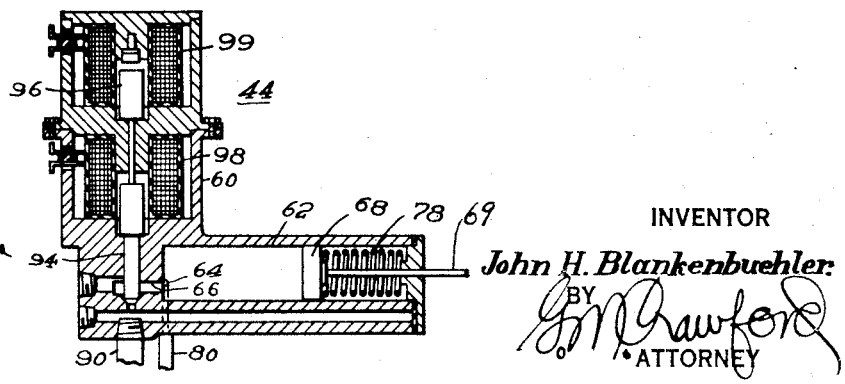
Fig. 3 is an enlarged elevational view, in section, of the idling device of Fig. 2 showing it in the operated position.

Upon the removal of the load from both of the generators 14 and 16, both of the operating windings 98 and 99 are thereby deenergized, and the armature 96 returns by gravity or other suitable means to the closed position, as illustrated in Fig. 3. As soon as the exhaust port 66 is closed by the valve 94, oil pressure builds up in the cylinder 62, forcing the piston 68 toward the right-hand end of the cylinder against the force of the spring 78 to actuate the lever 71 in a counterclockwise direction. The stop member 76 on the lever 71 engages the bell-crank lever 42 and forces it in the same direction against the force of the spring 52, thereby closing the throttle valve 36 and also rendering the governor 38 ineffective to control the throttle valve, thus reducing the speed of the engine to idling speed.

Because of the restricted dimensions of the inlet port 64 of the idling device 44, and the predetermined adjustment of the valve 88, which is positioned in the supply line 80, a predetermined interval of time is required for the piston 68 of the idling device 44 to be actuated from a normal running position, as shown in Fig. 2, to the idling position thereof, which is shown in Fig. 3. By varying the adjustment of the valve 88 so as to vary the rate of oil flow, the interval of time required after the removal of load from both of the generators 14 and 16 to effect sufficient travel of the piston 68 in the cylinder 62 for closing the throttle valve 36 may be varied over a wide range, so that the speed of the engine 10 will not be reduced to idling speed until the elapse of a predetermined variable interval of time after the deenergization of the load circuits.

Upon the application of a load to either or both of the generators 14 and 16, either or both of the operating windings 98 and 99 of the idling device 44 will be energized. The armature 96 is thereupon actuated to open the control valve 94, and the fluid pressure in the cylinder 62 is substantially immediately exhausted through the relatively large exhaust port 66. The piston 68 is then forced toward the left-hand end of the cylinder 62 by the spring 78, and the lever 71 is actuated in a clockwise direction so that the stop member 76 is disengaged from the bell-crank lever 42. The governor 38 is thereby rendered effective to actuate the throttle valve 36 in accordance with the speed of the engine, so as to maintain the operating speed thereof within a predetermined range.

From the above description, taken in connection with the accompanying drawing, it will be understood that I have provided in a simple and effective manner for controlling the operation of an internal combustion engine, which is connected for driving a plurality of generators. Where the generators have independently controlled load circuits, the engine will be responsive to load conditions in the said load circuits and respond immediately upon the application of load to either of the generators to operate within a predetermined speed range, and after the lapse of a predetermined interval of time after the removal of the load from both of the generators, the speed of the engine will be reduced to idling speed, so as to reduce the fuel consumption thereof.

Since certain changes may be made in the above description, and different embodiments of the invention may be made without departing from the spirit thereof, it is intended that all the matter contained in the above description, or shown in the accompanying drawing shall be considered as illustrative, and not in a limiting sense.

I claim as my invention:

1. The combination with an internal combustion engine having a throttle valve for controlling the flow of fuel to the engine and a governor for regulating the operation of the throttle valve in accordance with the speed of the engine to maintain a predetermined speed range under load conditions, of a plurality of generators connected to be driven by the engine, means for rendering the governor ineffective, and means responsive to the application of a load to any of the said generators for causing said means to render the governor effective to control the speed of the engine.

2. The combination in a welding system of an internal combustion engine having a throttle for controlling the flow of fuel to the engine, a governor operatively connected to the throttle valve for regulating the flow of fuel in accordance with the speed of the engine to maintain a predetermined speed, a plurality of welding generators having separate welding circuits connected thereto connected to be driven by the engine, means for rendering the governor ineffective so as to operate the engine at idling speed, and means associated with each of the welding circuits for controlling the operation of the aforesaid means in response to the flow of welding current to render the governor effective.

3. A power system comprising, an internal combustion engine having a throttle valve for controlling the flow of fuel to the engine, a governor operatively connected thereto for controllig the throttle valve to maintain the engine at a predetermined speed, a plurality of welding generators connected to be driven by the engine, a welding circuit connected to each generator, and means associated with each welding circuit responsive to the termination of current flow in all of the said welding circuits for rendering the governor ineffective after the lapse of a predetermined interval of time and for reducing the speed of the engine to idling speed.

4. The combination in a welding system, of a plurality of welding generators, a welding circuit associated with each welding generator, a prime mover connected for driving the generators, a throttle device operative to maintain the prime mover within a predetermined range of speed, an idling device operable to reduce the speed of the prime mover to idling speed, and means responsive to the flow of welding current in at least one of the welding circuits to prevent the operation of the idling device.

5. Control means for a multiple circuit welding system having a plurality of welding generators with driving connection to a prime mover provided with a throttle device for controlling the speed of the prime mover comprising, a governor for controlling the throttle valve to maintain the speed of the prime mover within a predetermined range, idling means operable to render the governor ineffective and reduce the speed of the prime mover to idling speed, and a winding connected to be responsive to the flow of current in each welding circuit for preventing the operation of the idling means until a predetermined interval of time after the termination of the flow of the welding current in said circuits.

6. The combination in a multiple circuit welding system, of a plurality of welding generators, a welding circuit connected to each generator, a common prime mover for the said generators, a throttle device for controlling the speed of the prime mover, a governor for controlling the throttle device to maintain a predetermined speed of the prime mover, an idling device disposed to oppose the operation of the governor and reduce the speed of the prime mover to idling speed, and means connected with the welding circuits to prevent operation of the idling device so long as welding current flows in any one of the said circuits.

7. A multiple-generator welding system comprising, a plurality of welding generators having a common prime mover, a welding circuit connected to each generator, a throttle device for controlling the speed of the prime mover, a governor for operating the throttle device to maintain a predetermined prime mover speed, fluid pressure actuated means operatively connected to the governor for rendering the governor ineffective to maintain the predetermined speed, control means having operating windings separately connected to the said welding circuits and individually effective to control the operation of the fluid pressure device in accordance with load conditions of any of the generators so as to provide for a gradual reduction in the speed of the prime mover to idling speed upon the removal of load from all of the welding circuits, and immediately render the governor effective in response to the application of load to any one of the said circuits.

8. A control system for a multiple-generator welding system having a plurality of welding generators with a common driving means, comprising a throttle valve for controlling the speed of the prime mover, a governor operatively connected to the throttle valve for maintaining the prime mover within a predetermined range of speed, fluid-pressure means operative to control the governor and reduce the engine to idling speed, valve means for controlling the operation of the fluid pressure means, and control means in each welding circuit responsive to the flow of welding current for operating the valve means to render the fluid pressure means inoperative.

9. The combination with a plurality of generators having separate welding circuits connected thereto and an internal combustion engine for a common prime mover, of a throttle valve for controlling the rate of fuel flow to the engine, a governor driven by the engine operatively connected to the throttle valve for regulating the flow of fuel to maintain the speed of the engine within a predetermined operating range, an idling device provided with a cylinder having an outlet port and a restricted inlet port, a source of fluid pressure connected to the inlet port, a control valve operable to open and close the exhaust port to control the fluid pressure in the cylinder, a piston in the cylinder adapted to be actuated at a predetermined rate by the fluid pressure therein upon the closing of the exhaust port, means effective upon actuation of the piston to actuate the throttle valve at a predetermined rate to the idling position, and a plurality of operating windings for the control valve connected to be responsive to the flow of current in the welding circuits to retain the control valve in the open position so long as at least one of the welding circuits is energized so as to prevent the actuation of the piston and thus retain the engine at operating speed.

10. The combination with a plurality of generators having a common driving means, of speed control means for maintaining the speed of the driving means within a predetermined range, means operable to render the speed control means ineffective, and control means responsive to the application of a load to any of the said generators to render said second mentioned means inoperable.

11. A power system comprising, a plurality of generators having load circuits connected thereto and a common driving means, regulating means effective to maintain the speed of the driving means within a predetermined range, and means normally rendering the regulating means ineffective operable upon the application of a load to any of the said load circuits to render the regulating means effective.

12. The combination with a power system in which a plurality of generators with load circuits have a common driving means, of regulating means effective to maintain the speed of the driving means within a predetermined range, means normally operable to render the regulating means ineffective, and electromagnetic means responsive to the energization of one of the load circuits to render said second mentioned means inoperative.

JOHN H. BLANKENBUEHLER.